United States Patent
Myles et al.

(10) Patent No.: US 6,422,058 B1
(45) Date of Patent: Jul. 23, 2002

(54) RAILROAD CAR COUPLING SIMULATOR AND METHOD

(76) Inventors: J. Edgar Myles, 3246 Woodview Lake Rd., West Bloomfield, MI (US) 48323; J. Scott Myles, 3181 Pebble La., Bloomfield Township, MI (US) 48301

(*) Notice: Subject to any disclaimer, the term of this patent is extended or adjusted under 35 U.S.C. 154(b) by 0 days.

(21) Appl. No.: 09/632,440

(22) Filed: Aug. 4, 2000

(51) Int. Cl.[7] .............................................. G01M 17/04
(52) U.S. Cl. ..................... 73/12.04; 73/12.09; 73/865.6
(58) Field of Search ............................. 73/12.01, 12.04, 73/12.09, 865.6

(56) References Cited

U.S. PATENT DOCUMENTS 3,939,691 A * 2/1976 Stanev et al. .............. 73/12.01
4,545,236 A    10/1985 Turczyn
5,614,656 A * 3/1997 Toda et al. ................ 73/12.01

* cited by examiner

Primary Examiner—Robert Raevis
(74) Attorney, Agent, or Firm—Alex Rhodes

(57) ABSTRACT

An efficient and effective computerized apparatus and method for determining the effects of railroad car humping on cargo in railroad cars. The invention broadly comprises a twelve-wheel test cart mounted on a pair of rails for simulating a rail car; an impact structure for simulating rail cars during humping; an electric motor drive unit for accelerating and propelling the test cart toward the impact structure, a series of hydraulic accumulator springs and valves for decelerating the test cart during the humping of the test cart with the impact structure, and a programmed computer for controlling test variables. The test apparatus allows the levels of severity to be readily changed and the test cart to be positively coupled to the impact structure or to rebound from the impact structure.

20 Claims, 4 Drawing Sheets

RAILROAD CAR COUPLING SIMULATOR AND METHOD

FIELD OF THE INVENTION

This invention relates to impact testing and more particularly to a computerized simulator and method for determining the effects on cargo during a railroad car humping.

BACKGROUND OF THE INVENTION

The coupling of rail cars is commonly referred to as a humping. During a humping of railroad cars, cargos are subjected to high inertia loads. If their containers and/or shipping provisions are inadequate, damage can occur, resulting in insurer losses and higher consumer prices. Simulators exist for evaluating the effects on cargo and their containers of humping. They rely on the deformation of rubber, plastic, springs, weights, etc. to rapidly decelerate the cargo. Tests show that the simulators do provide meaningful results for preventing damage and optimizing shipping provisions and containers. Consequently, producers and shippers must rely on actual experiences which are often costly and detrimental to customer goodwill. Moreover, many containers and shipping provisions are inadequate or more costly than necessary. A further problem with existing simulators is that they cannot be easily modified to simulate alternate levels of severity of rail car humping.

Turczyn, U.S. Pat. No. 4,545,236 is exemplary of existing rail car humping simulators. Turczyn discloses a cargo, carried on a sled, which is accelerated by gravity down an inclined plane. At the bottom of the plane there is a deformable cylinder which decelerates the sled and its cargo. The dynamic crush properties of the deformable cylinder are established from accelerometers mounted on railroad cars. After each test, the deformable cylinder is replaced.

SUMMARY OF THE INVENTION

The present invention completely overcomes problems and shortcomings of existing simulators by providing an efficient, easy to use, computerized apparatus and method for simulating railroad car humping. The invention resides in features which individually and collectively contribute to its ability to efficiently and reliably replicate inertia loads on cargo during "humping." One advantage of the invention is that a manufacturer can reduce the time for developing adequate provisions for shipping a new product. Another advantage is that test conditions can be easily modified to vary levels of severity. Another advantage is that test results can be quickly obtained. Still yet another advantage is that test results are repeatable. Still yet another advantage is that test results correlate substantially better with real world conditions than those of simulators heretofore available.

The invention broadly comprises a twelve-wheel test cart mounted on a pair of rails; an impact structure for simulating rail cars which are coupled to the test cart; a means for propelling the test cart toward the impact structure, a means for decelerating the test cart during a humping of the test cart with the impact structure; and a programmable computer for controlling the test. Preferred means are disclosed for accelerating and decelerating the test cart during the simulated humping.

Further objects, benefits and features of the invention will become apparent from the ensuing detailed description and drawings which illustrate and describe the invention. The best mode which is contemplated in practicing the invention together with the manner of using the invention are disclosed and the property in which exclusive rights are claimed is set forth in each of a series of numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

DESCRIPTION OF THE PREFERRED EMBODIMENTS

Figure 1:
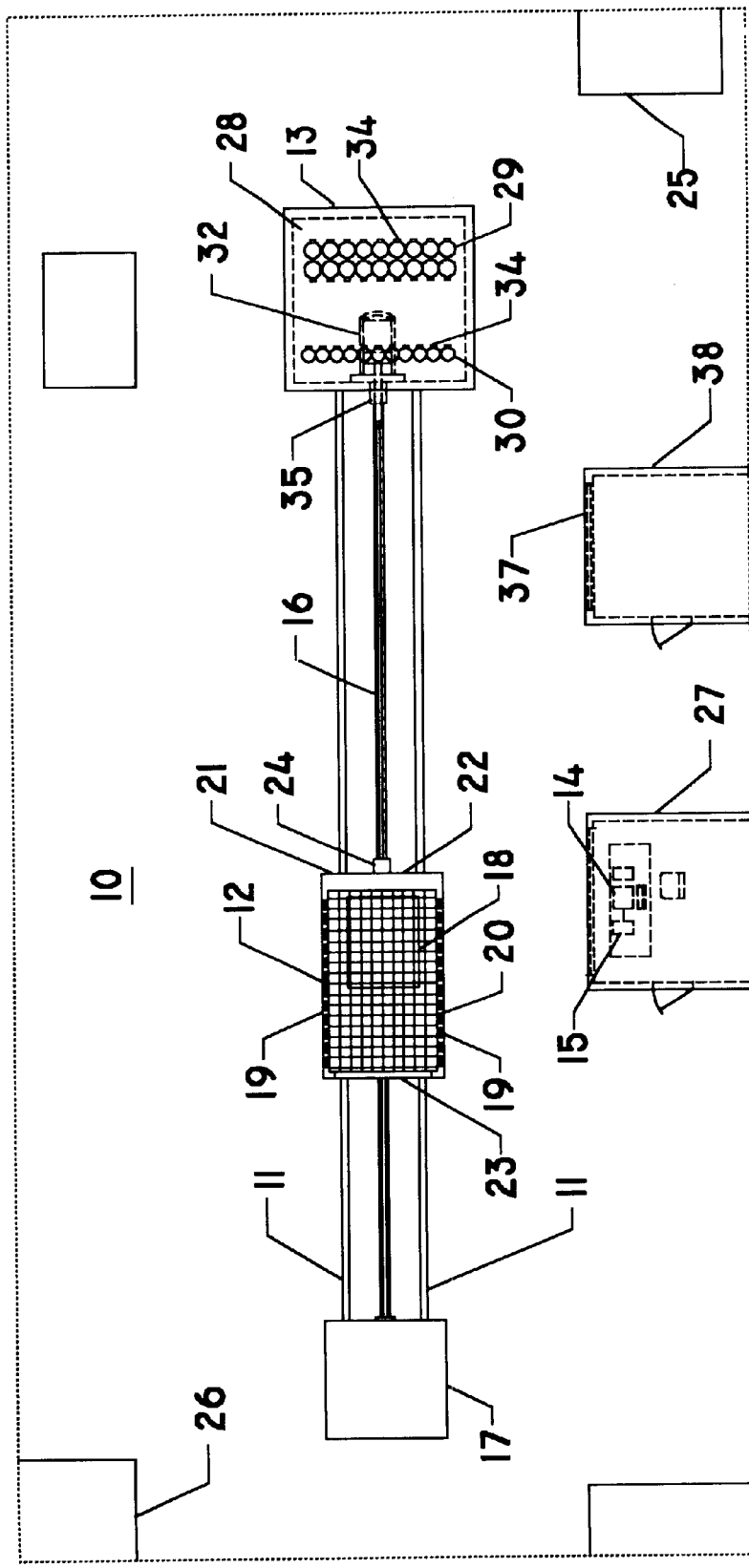
FIG. 1 is a plan view of a rail car "humping" simulator which embodies the present invention.

Referring now to the drawings, in FIGS. 1 through 4 inclusive, a computerized rail car "humping" simulator is shown in diagrammatic form for the non-limiting purpose of describing the invention. The primary objects of the simulator is to increase profits and decrease consumer prices. These objectives are met by efficiently simulating rail car humping in a manner which closely correlates with conditions in the field. Test results are used for optimizing shipping provisions and prevent damage to cargo and containers.

The simulator and method were developed from data which was acquired during two years of extensive testing of different rail systems at various locations. Testing has verified that the simulator and method accurately simulate conditions which exist during rail car "humping". The simulator is comprised of a pair of horizontal rails 11, a twelve-wheel test cart 12 mounted on the rails 11, a means for propelling the test cart 12, an impact structure 13 for decelerating the test cart 12, a programmable computer 14; and computer software 15 for selectively varying the severity of humping.

In the preferred apparatus shown in FIGS. 1 through 4, the test cart 12 is connected by a pair of chains 16 to an electric motor drive unit 17. The chains 16 and drive unit 17 comprise the means for propelling the test cart 12 toward the impact structure 13. Other well known devices are available which can be used for propelling the cart 12, by way of example, ball screws, hydraulic cylinders or motors, pneumatic cylinders, cables, adjustable inclined tracks and hydrostatic transmission driven cables. The chains 16 and electric motor drive unit 17 are capable of providing cart speeds as high as 16 miles per hour. To date, the most common cart speeds with the preferred embodiment 10 have been 6 and 8 miles per hour. During a test program, the two speeds are generally used. If damage occurs at the lower speed, the testing is halted until improvements are made which result in a satisfactory test. Thereafter, a test is made at the higher cart speed.

The twelve-wheel test cart 12 is somewhat shorter than a typical rail car but similar in width, height and weight (19,000 pounds) to a typical rail car. The top 18 and sides 19 of the cart 12 are enclosed with an open wire grid 20 to allow viewing and photographing of a cargo in the cart 12. A sound proof room 38 with a glass window 37 is provided for shielding observers from the excessive shock waves which occur during a humping of the cart 12 with the impact structure 13. The front 21 of the cart 12 is a rigid bulkhead 22 and the rear 23 is left open to allow loading of the cargo. On the forward bulkhead 22 there is a male member 24 of a rail car coupling. Power is supplied to the electric motor drive 17 by an electrical power supply 25 which provides power to all systems of the humping simulator 10. An air compressor 26 in a separate room provides power for chain tensioning.

The electric motor drive 17 and power supply 25 are operatively connected to the computer 14 which is located in a computer control center 27. The acceleration and velocity of the test cart 12 are determined by the force of the chains 16 and its duration. The acceleration and speed of the cart 12 are set by an encoder signal to the computer 14 in a closed-loop feedback system with the electric motor drive 17 propelling the cart 12 on the dual rails 11. The computer control center 27 houses all of the control system components, including the computer 14 and "E" stops. The computer's software 15 consists of a group of application programs which manage the overall operation of the system, including the motion of the cart 12 and the hydraulic system which decelerates the cart 12. The relationship between the test variables are shown in the following $2^{nd}$ order homogeneous differential equation:

$$m\ddot{x}+c\dot{x}+kx=0$$

where:

$\ddot{x}$=acceleration of the rail car m=combined mass of rail cart and test specimen $\dot{x}$=velocity of rail car c=damping of hydraulic system x=displacement of rail car k=spring rate of hydraulic system (accumulators)

The solutions of the above equation fall under the following conditions:

$c^2>4$ mk overdamped $c^2=4$ mk critically damped $c^2<4$ mk underdamped

The spring rate k is derived by correlating test data with measurements of rail car systems. In the preferred embodiment 10, the spring rate for various levels of severity was found to be within the range of 1500 pounds per inch to 3500 pounds per inch. It will be appreciated that the range may vary somewhat because of differences in test apparatus.

Computer programs, namely C++, Lookout, Labview, Windows and Excel are used with the preferred embodiment 10 for operating the simulator system 10. Other well known computer programs and/or micro processors are also available for performing control functions. Test results of the preferred embodiment 10 show that cart acceleration can be controlled within 0.2 g's and cart deceleration can be varied between 50 and 400 ms, depending on the inputs at the computer control center 27.

The impact structure 13 includes a usual type superstructure, a massive fixed concrete barrier 28, two groups of accumulator gas springs 29, 30, control valves 24 and a piston 32 in a hydraulic cylinder 33 which transfers oil between a blind impact end of the cylinder 33 to a preselected number of the accumulator springs 29, 30. The accumulator springs are the usual type of hydraulic/pneumatic springs which absorb impact energy by compressing a gas, such as nitrogen. The gas is pre-loaded by a non-compressible hydraulic fluid which is separated from the gas by a piston or bladder. The gas, stored in the accumulator springs, being compressible, acts as a spring. The impact energy of the test car 12 is transmitted by the non-compressible liquid (hydraulic oil) and is absorbed by compressing the gas. The accumulator springs 29, 30 decelerate the test cart 12 during a humping with the impact structure 13. Other energy absorbing systems, such as pneumatic cylinders, can be used for decelerating the cart 12.

Figure 2:
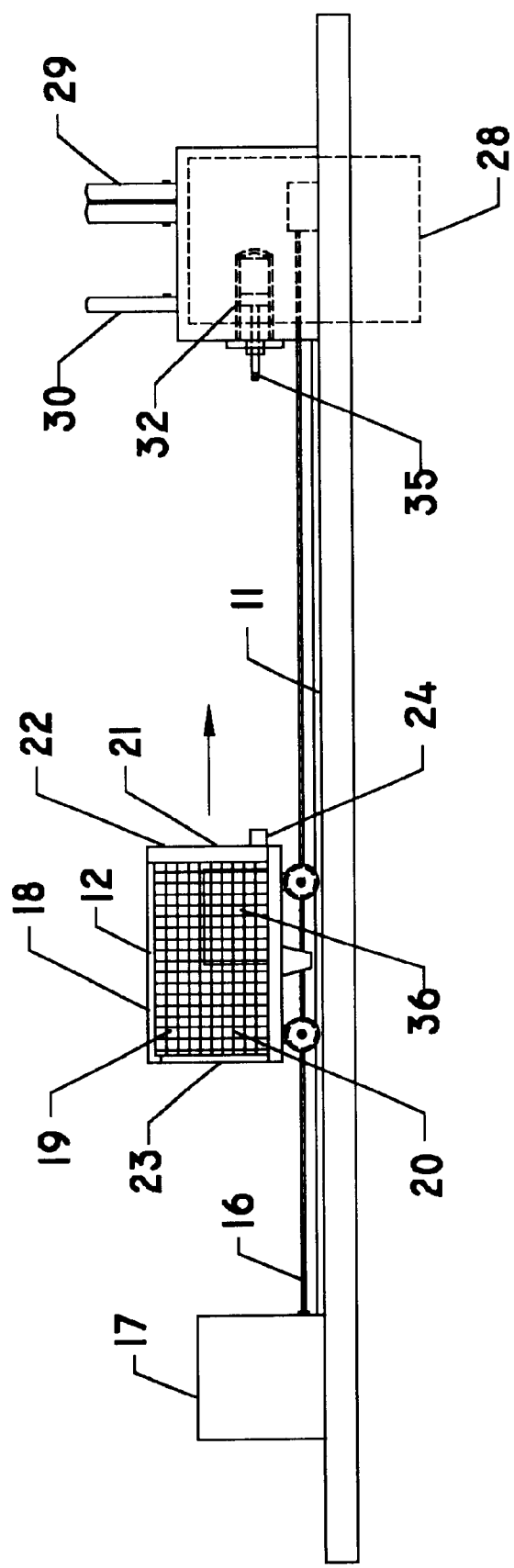
FIG. 2 is a side elevational view of the simulator.
Figure 3:
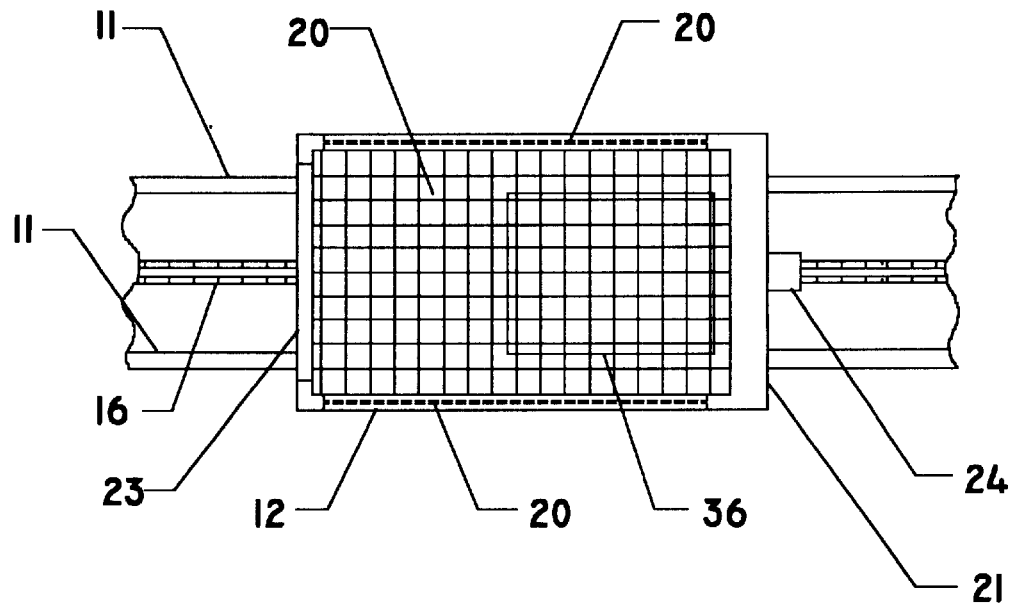
FIG. 3 is an enlarged plan view of a rail cart.
Figure 4:
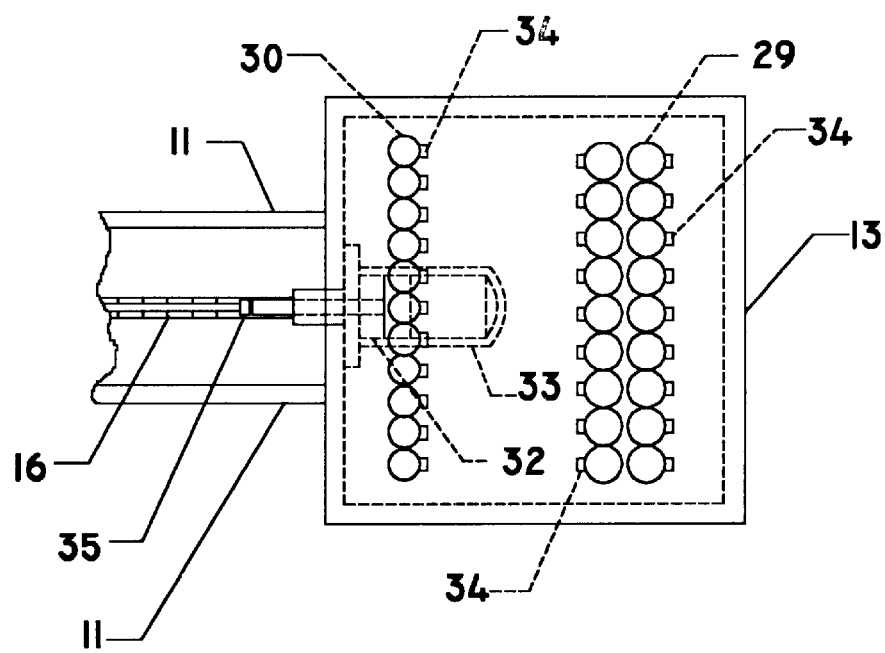
FIG. 4 is an enlarged plan view of an impact structure.
Figure 5:
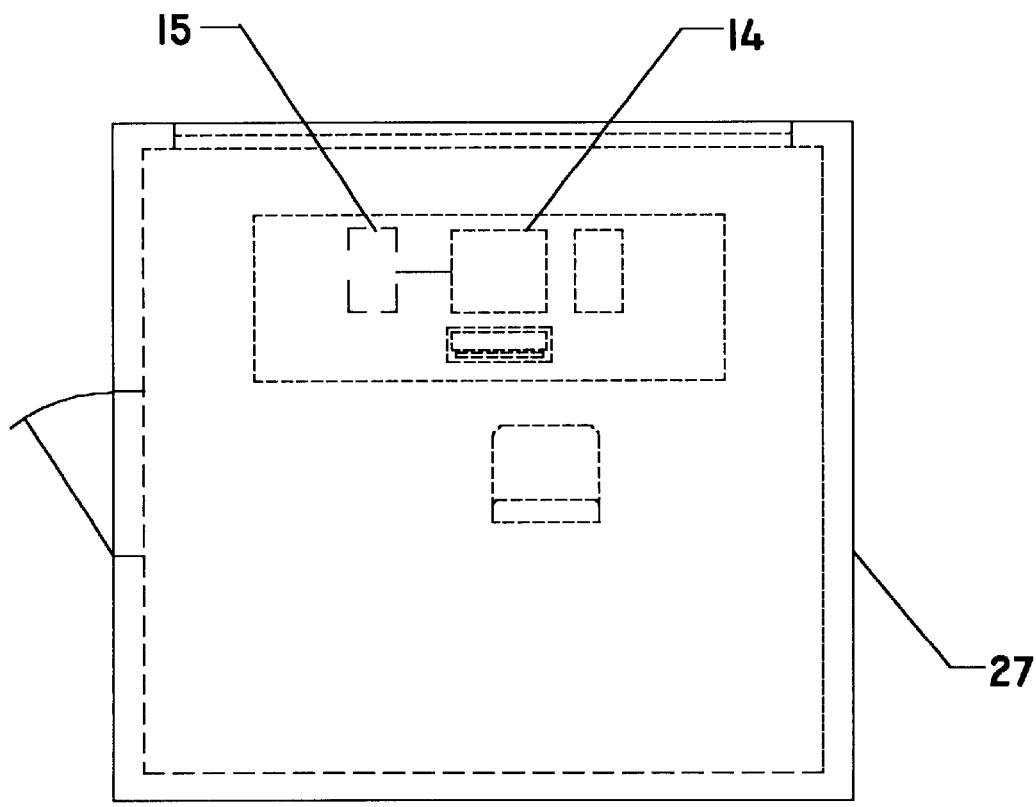
FIG. 5 is an enlarged plan view of a computer control center.

The two groups of accumulator springs 29, 30 are shown in FIGS. 1 and 2. In a selected number of the first group of eighteen accumulator springs 29 are fluidly connected and supply oil to the rear side of the piston 32 and provide the force for decelerating the cart 12 during the humping with the impact structure 13. A selected number of the second group of eleven accumulator springs 30 are fluidly connected and supply oil to the front of the piston 32 and act in the opposite direction to the first group 29 to satisfy the high flow requirements to the cylinder rear end. They also establish the initial position of the piston 32 prior to an impact. A set of control valves 34 which operate by inputs from the computer 14 select the number of accumulator springs 29, 30 of the first 29 and second 30 groups which are used during a test.

The stroke of the piston 32 and the selected number of accumulator springs 29, 30 decelerate the cart 12 for a given impact velocity and load. The piston's stroke is manually adjustable but can be adjusted at the computer 14 by utilizing well known systems, such as servo motors, valves and controls or stepping motors, ball screws and controllers for setting the stroke. A female member 35 of the rail car coupling is attached on the forward end of the piston 32.

A test is conducted in the following manner. The level of severity is specified by a requester, based on prior experience or a recommendation of the test facility, if the requester lacks experience. Test variables at the computer 14 and the piston stroke is manually set according to the level of severity. A cargo specimen 36 is preferably placed on the test cart 12 rearward of the cart's front bulkhead 22 to simulate a common real world condition. Spacing the cargo away from the bulkhead 22 increases the severity of the test over a position against the bulkhead 22. A distance of four inches has been found to be typical of the real world.

At the onset of the test, the chains 16 and motor drive unit 17 accelerate the cargo specimen 36 for a specified time interval toward the impact structure 13. This establishes the velocity at which the cart 12 impacts the piston 32. When the cart 12 couples with the piston 32, two options are available. With the first option, the cart 12 is not allowed to rebound away from the impact structure 13. This is accomplished by positively coupling the male coupling member 24 of the test cart 12 with the female member 35 at the end of the piston 32. With the second option, the female coupling member 35 allows the male member 24 to disengage and the test cart 12 to rebound.

When coupling occurs, the cart 12 rapidly decelerates, but the test specimen 12 continues with the same forward motion until contacting the bulkhead 22 of the decelerating cart 12. After the contact occurs, the test specimen begins to decelerate with the cart 12 in a controlled manner to replicate real-world conditions. Physical damage to the test specimen 36 and dunnage, if present, are observed through a safety glass window 37 of the soundproof room 38.

From the above it will be appreciated that our invention provides an efficient and reliable apparatus and method for evaluating the effects on a specific cargo of rail car coupling. Moreover, it can increase an insurer's profits and lower consumer prices.

Although only one embodiment of our invention has been disclosed, it is not our intention to limit our invention to this embodiment, since after having the benefit of our disclosure, other embodiments can be developed by such changes as inversion of elements, substitution of materials and parts and changes in materials which are known and obvious to persons skilled in the arts to which our invention relates.

We claim:

1. A test apparatus for determining the effects of rail car humping on a cargo specimen stored in a rail car comprising: a test cart which simulates a rail car for propelling a cargo specimen toward an impact structure which simulates one or more other rail cars, said test cart having a bounded space for enclosing said cargo specimen and a first member of a rail car coupling extending forwardly from said test cart; a means connected to said test cart for accelerating said test cart toward a fixed energy absorbing impact structure; a fixed energy absorbing impact structure for rapidly decelerating said test cart during a frontal impact of said test cart with said impact structure, said impact structure having a second complementary coupling member extending rearwardly from said impact structure to engage said first coupling member of said test cart; a means for propelling said test cart toward said impact structure; a means in said impact structure for rapidly decelerating said test cart during an engagement of said coupling members; a programmable computer operatively connected to said means for accelerating and said means for decelerating said test cart; and computer software for processing a set of input variables for controlling said acceleration and said deceleration of said test cart.

2. The apparatus recited in claim 1 wherein said means for accelerating said test cart toward said impact structure comprises a pair of rails for carrying said test cart; an electric motor drive unit; and at least one chain for operatively connecting said test cart and said electric motor drive unit.

3. The apparatus recited in claim 1 wherein said means for decelerating said test cart is a hydraulic system comprised of a cylinder mounted in said impact structure, a piston inside of said cylinder, said piston connected to said complementary coupling member extending rearwardly from said impact structure; and a plurality of accumulator springs operatively connected to said cylinder for decelerating said cart.

4. The apparatus recited in claim 3 wherein said accumulator springs comprise a first group of accumulator springs operatively connected to a forward side of said cylinder and a second group of accumulator springs operatively connected to a rearward side of said cylinder.

5. The apparatus recited in claim 4 wherein said first group accumulator springs is a group of eighteen accumulator springs and said second group of accumulator springs is a group of eleven accumulator springs.

6. The apparatus recited in claim 3 wherein a stroke of said piston is selectively adjustable.

7. The apparatus recited in claim 1 wherein said motion of said test cart is a solution of the following 2nd order homogeneous differential equation:

$$m\ddot{x} + c\dot{x} + kx = 0$$

where: $\ddot{x}$=deceleration of said test cart
m=combined masses of said test cart and a test specimen
$\dot{x}$=velocity of said test cart
c=damping coefficient of said hydraulic system
x=displacement of said test cart
k=spring rate of said hydraulic system where:
$c^2 > 4$ mk for an overdamped hydraulic system
$c^2 = 4$ mk for a critically damped hydraulic system
$c^2 < 4$ mk for an underdamped hydraulic system.

8. The apparatus recited in claim 7 wherein k is within the range of about 1500 pounds per inch to about 3500 pounds per inch.

9. The apparatus recited in claim 8 wherein the mass of said rail cart is about 19,000 pounds.

10. The apparatus recited in claim 9 further comprising a sound proof room adjacent said rail with a window for observing said cargo during said test.

11. The apparatus recited in claim 1 wherein said bounded space for enclosing a cargo of said test cart is comprised of an open wire grid top and sides, a solid front bulkhead and an open rear portion.

12. A test apparatus for determining the effects of rail car humping on a cargo specimen in a railroad car comprising: a pair of rails for supporting a test cart; a test cart mounted on said rails having a width, height and weight which are similar to a rail car for carrying a cargo specimen toward a simulated humping with an impact structure, said test cart having a bounded space for enclosing a cargo specimen; a fixed impact structure for decelerating said test cart during a simulated humping of said test cart with said impact structure; a means for propelling said test cart toward said impact structure; a means in said impact structure for decelerating said test cart during said simulated humping with said impact structure; a computer operatively connected to said means for accelerating and said means for decelerating said test cart; and computer software programs installed in said computer for processing a set of input variables to control said means for accelerating and said means for decelerating said test cart.

13. A test apparatus for determining the effects of rail car humping on a cargo specimen in a railroad car comprising: a pair of rails for supporting a test cart; a test cart mounted on said rails having a weight of about 19,000 pounds and a width and height and weight which are similar to a rail car for carrying a cargo specimen toward a simulated humping with an impact structure, said test cart having a bounded space for enclosing said cargo specimen; a fixed impact structure for decelerating said test cart during said simulated humping with said impact structure, said impact structure having a hydraulic cylinder and a piston in said cylinder; an electric motor drive unit and chains for propelling said test cart towards said impact structure; a plurality of accumulator springs and valves operatively connected to said cylinder of said impact structure to transmit a force to said piston for decelerating said test cart during said simulated humping with said impact structure; a computer operatively connected to said electric motor drive unit and said plurality of accumulator springs and valves; and computer software programs installed in said computer for processing a set of input variables to control said electric motor drive unit and the operation of said plurality of accumulator springs.

14. A method for simulating a rail car humping to determine the effects of said humping on a cargo specimen stored in said rail car comprising the steps of; inputting a group of test variables which determine the level of severity of said humping of said rail car in a computer; installing a cargo specimen in a bounded space of a test cart, said test cart having a weight, width and height which are similar to said rail car; propelling said test cart toward a fixed impact structure which simulates one or more other rail cars; impacting said test cart with said impact structure to simulate said humping; and decelerating said test cart with said impact structure according to said level of severity.

15. The method described in claim 14 further comprising the step of allowing said test cart to rebound away from said impact structure.

16. The method described in claim 14 wherein said test specimen is positioned in said bounded space of said test cart away from a forward bulkhead of said bounded space of said test cart.

17. The method described in claim 16 wherein said test specimen is positioned about four inches away from said forward bulkhead of said test cart.

18. The method described in claim 16 wherein said test cart is accelerated to a speed of about 6 miles per hour prior to said impact of said test cart with said impact structure.

19. The method described in claim 16 wherein said test cart is accelerated to a speed which lies within a range of 2 to 16 miles per hour prior to said impact with said impact structure.

20. The method described in claim 16 further comprising the step of observing the condition of said cargo specimen from a sound proof enclosure.

* * * * *

UNITED STATES PATENT AND TRADEMARK OFFICE
CERTIFICATE OF CORRECTION

PATENT NO.   : 6,422,058 B1
DATED        : July 23, 2002
INVENTOR(S)  : J. Edgar Myles and J. Scott Myles Page 1 of 1

It is certified that error appears in the above-identified patent and that said Letters Patent is hereby corrected as shown below:

<u>Column 5,</u>
Line 59, change "$mx + cx + kx = 0$" to --$m\ddot{x} + c\dot{x} + kx = 0$--

Line 60, change "$x$ = deceleration" to --$\ddot{x}$ = deceleration--

Line 62, change "$x$ = velocity" to --$\dot{x}$ = velocity--

Signed and Sealed this

Nineteenth Day of November, 2002

Attest:

Attesting Officer

JAMES E. ROGAN
*Director of the United States Patent and Trademark Office*